(12) United States Patent
Sakai et al.

(10) Patent No.: US 6,868,823 B2
(45) Date of Patent: Mar. 22, 2005

(54) INTAKE APPARATUS FOR INTERNAL COMBUSTION ENGINE

(75) Inventors: Taro Sakai, Kawasaki (JP); Kanjo Arimatsu, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/676,077

(22) Filed: Oct. 2, 2003

(65) Prior Publication Data
US 2004/0065297 A1 Apr. 8, 2004

(30) Foreign Application Priority Data
Oct. 3, 2002 (JP) .......................................... 2002-290749

(51) Int. Cl.[7] .............................................. F02D 31/64
(52) U.S. Cl. ........................ 123/306; 123/308; 123/432
(58) Field of Search ................................ 123/306, 308, 123/432, 188.14

(56) References Cited

U.S. PATENT DOCUMENTS 4,811,231 A * 3/1989 Hataoka et al. ........ 123/188.14
5,329,912 A * 7/1994 Matsumoto et al. ........ 123/308
5,370,098 A * 12/1994 Iida ............................. 123/306
5,662,077 A * 9/1997 Boswell .................. 123/184.21
6,065,459 A * 5/2000 Stevens ....................... 123/590

FOREIGN PATENT DOCUMENTS

JP         6-159079 A      6/1994
JP      2002-54535 A      2/2002

OTHER PUBLICATIONS

U.S. Appl. No. 10/676,015, filed Oct. 2, 2003, Arimatsu et al.

* cited by examiner

*Primary Examiner*—Erick Solis
(74) *Attorney, Agent, or Firm*—Foley & Lardner LLP (57) ABSTRACT

An intake apparatus for an internal combustion engine includes an intake port having therein first and second regions extending longitudinally of the intake port. There is further provided a recirculating section defining an intake recirculation passage to recirculate part of intake air from the second region in the intake port to an upstream portion in the intake port to strengthen an intake air stream in the first region of the intake port.

13 Claims, 11 Drawing Sheets

INTAKE APPARATUS FOR INTERNAL COMBUSTION ENGINE

BACKGROUND OF THE INVENTION

The present invention relates to intake apparatus or system for an internal combustion engine, and more specifically to an intake apparatus including an intake port for increasing incylinder gas motion such as tumble or swirl.

Gas motion in engine cylinder such as tumble or swirl is important to achieve stable combustion of diluted air/fuel mixture in a spark ignition internal combustion engine. Accordingly, engines of some types require an intake system which can increase incylinder gas motion in wider engine operating region.

A published Japanese Patent Application Kokai Publication No. 2002-54535 shows a gas motion control valve to increase incylinder gas flow by closing a half of the section of an intake port. A published Japanese Patent Application Kokai Publication No. H06(1994)-159079 shows an intake system including a partition dividing an intake port into upper and lower halves, and a gas motion control valve closing the lower half of the intake port, to increase a tumble ratio.

SUMMARY OF THE INVENTION

Such a gas motion control valve is arranged to produce an incylinder tumbling flow by decreasing an open area ratio that is a ratio of an effective flow passage sectional area to an entire flow passage area of an intake port. However, as the open area ratio becomes smaller, the flow resistance increases, and the amount of intake air that a cylinder can take in becomes smaller. Therefore, an engine operating region in which an incylinder flow is increased by a gas motion control valve is limited to a relatively narrow range.

It is an object of the present invention to provide an intake apparatus for increasing incylinder gas motion without decreasing the open area ratio of an intake port excessively.

According to one aspect of the present invention, an intake apparatus for an internal combustion engine, comprises: a main section defining an intake port having therein first and second regions extending longitudinally of the intake port; and a recirculating section defining an intake recirculation passage to recirculate part of intake air from the second region in the intake port to an upstream position in the intake port to strengthen an intake air stream in the first region of the intake port.

According to another aspect of the invention, an internal combustion engine comprises: an engine block member defining an engine cylinder and an intake port extending to the cylinder; an intake valve to open and close a downstream end of the intake port; and a recirculating section defining an intake recirculation passage to recirculate part of intake air to strength an intake air stream flowing into the cylinder through a first part of a downstream end portion of the intake port and weaken an intake air stream flowing into the cylinder through a second part of the downstream end portion of the intake port when the intake valve is opened. The recirculation passage extends from a recirculation inlet opened in the downstream end portion of the intake port to take in part of intake air from the second part of the downstream end portion of the intake port, to a recirculation outlet to discharge the intake air into an upstream portion of the intake port upstream of the downstream end portion to strengthen the intake air stream through the first part of the downstream end portion of the intake port.

According to still another aspect of the invention, an intake apparatus comprises: first means for defining an intake port having therein first and second regions extending longitudinally of the intake port; and second means for defining an intake recirculation passage to recirculate part of intake air from the second region in a downstream end portion of the intake port, to the first region in an upstream portion of the intake port and thereby for strengthening an intake air stream in the first region of the intake port.

DETAILED DESCRIPTION OF THE INVENTION

Figure 1:
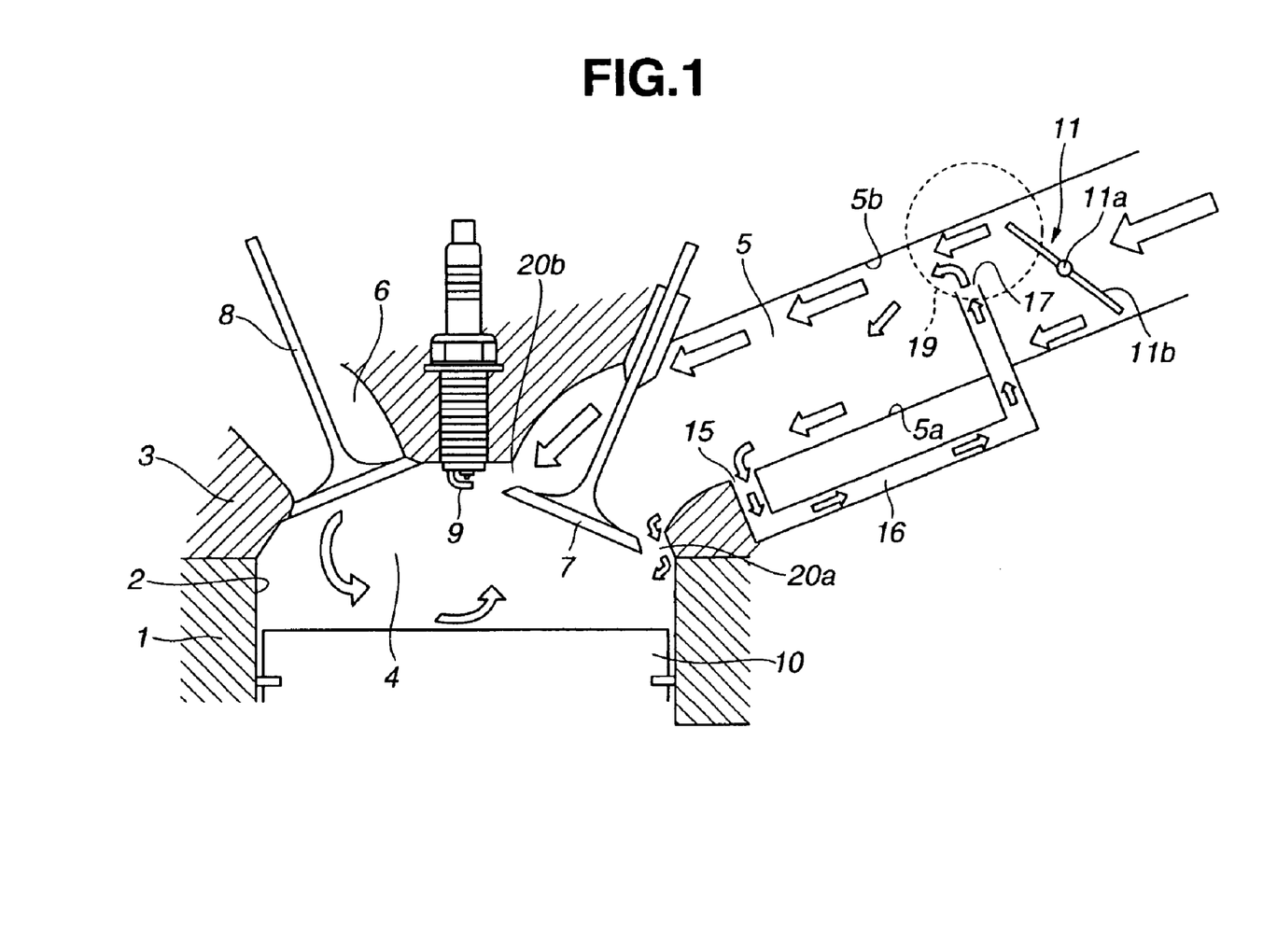
FIG. 1 is a sectional view showing an engine with an intake apparatus in a first practical example according to a first embodiment of the present invention.

FIG. 1 shows part of an internal combustion engine having an intake apparatus in a first practical example according to a first embodiment of the present invention. The engine of this example is an incylinder direct injection spark ignition engine. The intake apparatus or system is designed to strengthen an incylinder gas motion which, in this example, is tumble. In the first embodiment, an intake air recirculation passage is external to an intake port, unlike a second embodiment.

A cylinder block 1 is formed with a plurality of cylinders 2 having a cylindrical shape. A cylinder head 3 closes the upper ends of the cylinders 2. Cylinder head 3 is formed with a plurality of recesses each defining a combustion chamber 4. In this example, combustion chamber 4 of each cylinder is of the pentroof type, and having two sloping surfaces. As shown in FIG. 1, an intake port 5 extends to a downstream end opening in one of the two sloping surfaces of combustion chamber 4. An exhaust port 6 opens in the other sloping surface of combustion chamber 4. An intake valve 7 shown in FIG. 1 is arranged to open and close the downstream end of intake port 5. An exhaust valve 8 is arranged to open and close the end of exhaust port 6. In this example, a downstream end portion of intake port 5 is bifurcated, and has two branches each opening into combustion chamber 4. Accordingly, each cylinder has two intake valves 7 for opening and closing the downstream ends of two branches of intake port 5. Similarly, each cylinder has two exhaust valves 8. A spark plug 9 is provided at the center of combustion chamber surrounded by these four valves 7 and 8. A piston 10 is received in each cylinder 2. In FIG. 1, piston 10 is shown to have a flat top. However, the piston crown may be designed to have various shapes according to various requirements, such as requirement for stratified charge combustion. In an up-down (axial) direction of each cylinder, piston 10 moves upward toward spark plug 9, and moves downward away from spark plug 9.

A throttle valve 11 of a butterfly type is provided in intake port 5. This example employs a multi-throttle arrangement, and there are provided a plurality of throttle valves 11 each for a unique one of the cylinders 4. As shown in FIG. 1, throttle valve 11 includes a disk-shaped valve element 11b mounted on a rotatable valve shaft 11a extending in the direction of the cylinder row. In the valve opening operation, the upper half of valve element 11b swings to the downstream side and the lower half of valve element 11b swings to the upstream side in intake port 5. At an intermediate opening degree as shown in FIG. 1, valve element 11b is so inclined as to guide the intake air stream to the upper side as viewed in FIG. 1. "Upper" means "higher" in position in an axial direction of cylinder 2 from the position of the crankshaft toward the combustion chamber 4. Intake port 5 is an air passage which may be formed only in cylinder head 3. Alternatively, intake port 5 may be formed in cylinder head 3 and an external member, such as an intake manifold, fixed to cylinder head 3. In general, throttle valve 11 is installed in an external member external to cylinder head 3. In this case, the external member has a passage serving as a part of intake port 5. Thus, intake port 5 is not necessarily formed only in cylinder head 3.

A recirculation inlet 15 is opened in a lower inside wall surface 5a of intake port 5, and designed to take in intake air flowing in intake port 5. A tubular member (serving as a recirculating section) defining a recirculation passage 16 is external to intake port 5, and one end of the tubular member is connected with recirculation inlet 15. Recirculation inlet 15 may be a hole such as a circular hole; or may be a plurality of holes arranged in the direction of the cylinder row (in a direction perpendicular to the longitudinal direction of intake port 5); or may be a slit elongated in the direction of the cylinder row. Recirculation inlet 15 is located near intake valve 7, and located at a downstream position as close as intake valve 7.

Recirculation passage 16 extends from recirculation inlet 15, along intake port 5 toward the upstream of intake port 5, and a recirculation outlet section which opens, as a recirculation outlet 17, in intake port 5 at a position slightly downstream of throttle valve 11. In this example, the recirculation outlet section is in the form of a tube, and projects into intake port 5, toward an upper inside wall surface 5b of intake port 5, as shown in FIG. 1. Recirculation outlet 17 opens toward upper inside wall surface 5b, at a position just downstream of the upper half of valve element 11b of throttle valve 11.

The thus-constructed intake system is operated as follows: On intake stroke, intake valve 7 is opened and piston 10 descends in the downward direction in cylinder 2. In this case, intake air flows through throttle valve 11, and flows into cylinder 2 through an open aperture around intake valve 7. In the case of part load operation wherein the opening degree of throttle valve 11 is relatively small, throttle valve 11 serves as a flow throttling portion or device, for producing a low pressure region 19 on the downstream side thereof. Recirculation outlet 17 of recirculation passage 16 is opened in this low pressure region 19, and there is formed a pressure difference between recirculation inlet 15 and recirculation outlet 17. Because of this pressure difference, part of the intake air flowing along lower inside wall surface 5a in intake port 5 is sucked through recirculation inlet 15, into recirculation passage 16, and recirculated through recirculation passage 16, and recirculation outlet 17, to the low pressure region 19 on the upstream side of recirculation inlet 15. Recirculation outlet 17 discharges the recirculation air into the upper region in intake port 5 toward the upper inside wall surface 5b, and thereby strengthens the intake air stream in the upper region. Moreover, recirculation outlet 17 discharges the recirculation air upwards toward upper inside wall surface 5b, and thereby acts to press the intake air stream onto the upper inside wall surface 5b. Therefore, most of intake air flows along upper inside wall surface 5b to intake valve 7. Consequently, the intake flow rate is smaller and the flow velocity is lower in a lower portion 20a of the open aperture between intake valve 7 and the outer circumference of the cylinder 2. In an upper portion 20b of the aperture formed between intake valve 7 and spark plug 9, the intake flow rate is great and the flow velocity is high. In the cylinder 2, there is formed a strong tumbling fluid motion as shown by arrows in FIG. 1 (so-called forward tumble) flowing from the intake side of intake valves 7 to the exhaust side of exhaust valves 8, and toward the piston crown. This intake apparatus can promote the tumble in the cylinder effectively, by strengthening the upper intake flow stream, and on the other hand by reducing the lower intake flow stream flowing along the lower inside wall surface 5a, into cylinder 2 in such direction as to impede the incylinder tumbling motion.

The intake system according to the first embodiment is designed to strengthen the tumble (vertical swirl). However, the intakes system according to the first embodiment can be used for strengthening swirl (horizontal swirl) in cylinder 2 by changing the positions and orientations of recirculation inlet 15 and outlet 17. Alternatively, the intake system may be arranged to strengthen a swirling motion in an oblique plane by combining tumbling motion and swirling motion.

Figure 2:
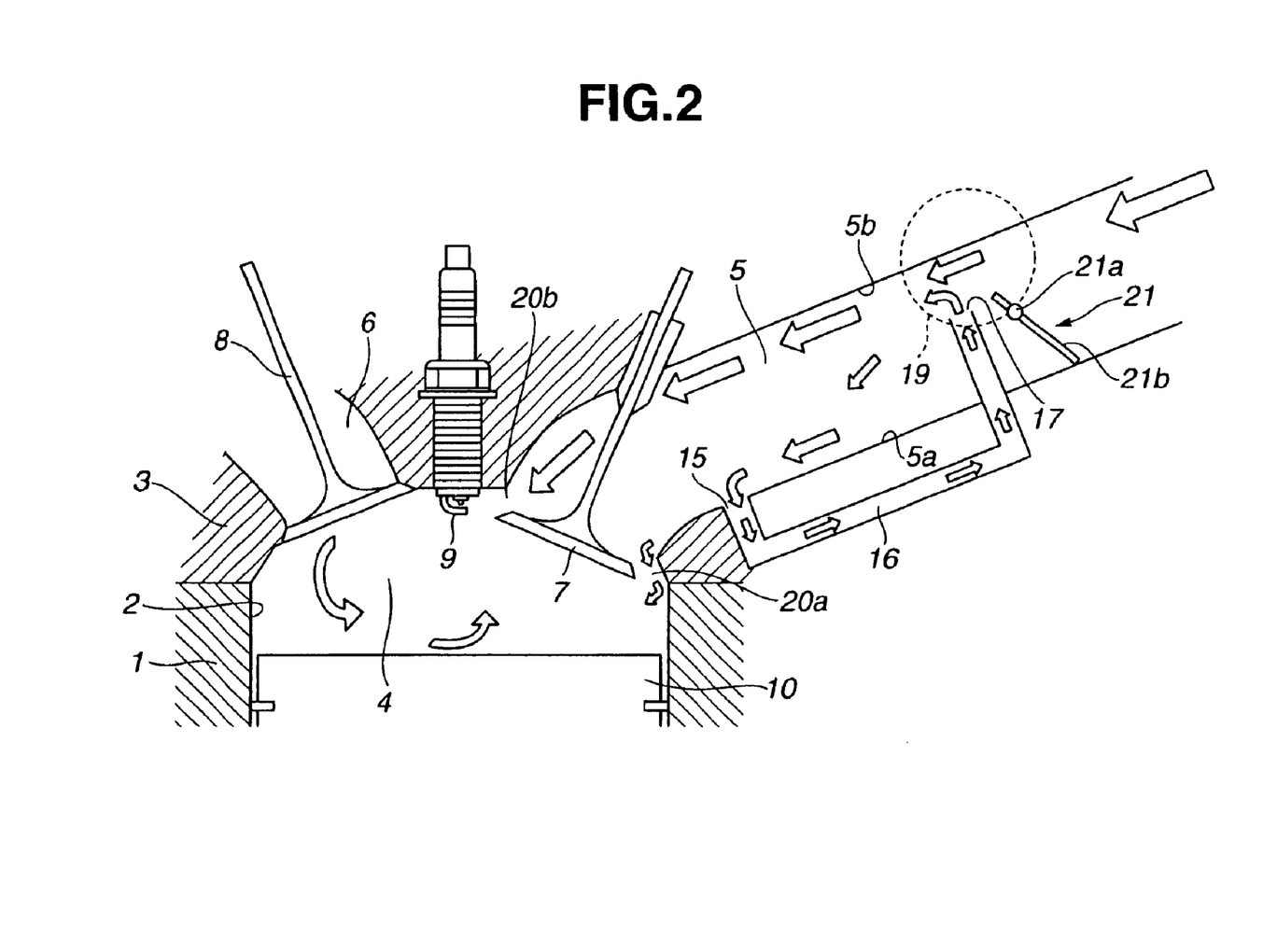
FIG. 2 is a sectional view showing an intake apparatus in a second practical example according to the first embodiment.

FIG. 2 shows an intake apparatus in a second practical example according to the first embodiment. The intake apparatus of FIG. 2 is substantially identical to the apparatus of FIG. 1 in most aspects as shown by the use of the same reference numerals. Unlike the first example, the second practical example employs, in place of throttle valve 11, a gas motion control valve 21 provided for each cylinder, to close a part of the sectional fluid passage area of intake port 5. A throttle valve (not shown in FIG. 2) is provided on the upstream side in the intake passage.

Gas motion control valve 21 includes a plate-shaped valve element 21b mounted on a rotatable valve shaft 21a extending in the direction of the cylinder row. The upper half of valve element 21b is partly cut out so as to hold the upper portion of intake port 5 open. The lower half of valve element 21b can close the lower part of intake port 5. Valve shaft 21a is connected with an actuator (not shown). Gas motion control valve 21 is controlled to a closed position shown in FIG. 2 in an engine operating situation to strengthen tumble. In an engine operating region such as a high speed high load region where the intake air quantity becomes greater, gas motion control valve 21 is brought to an open position at which valve element 21b extends in the longitudinal direction of intake port 5 (along the flow direction of the intake air). When gas motion control valve 21 is opened from the closed position of FIG. 2 to the open position, the lower half of valve element 21b swings to the upstream side. In the closed position shown in FIG. 2, valve element 21b is slightly inclined so as to guide the intake air toward upper inside wall surface 5b.

Recirculation inlet 15 and recirculation passage 16 are constructed in the same manner as in the first practical example of FIG. 1. Recirculation outlet 17 is located just behind gas motion control valve 21. The position of recirculation outlet 17 is located immediately downstream of the position of the upper end of valve element 21b in the closed position shown in FIG. 2.

When gas motion control valve 21 is in the closed position of FIG. 2 to close the lower half region in intake port 5, the intake air stream is deflected upward by the sloping surface of gas motion control valve 21, and most of the intake air flows along upper inside wall surface 5b. Thus, gas motion control valve 21 serves as a deflector and a flow throttling device, and functions to produce a local low pressure region 19 just downstream of gas motion control valve 21. Therefore, recirculation passage 16 having outlet 17 in this low pressure region 19 acts to suck the intake air in intake port 5 from recirculation inlet 15 as in the first practical example of FIG. 1, recirculates part of the intake air flowing along lower inside wall surface 5a of intake port 5, and discharges the recirculated air toward the upper inside wall surface 5b.

Specifically in the second practical example, gas motion control valve 21 is designed to deflect the intake air stream to the upper region along upper inside wall surface 5b, and the recirculation passage 16 removes part of intake air diffused into the lower region after the passage through gas motion control valve 21. Recirculation passage 16 can strengthen the tumble effectively in cooperation with gas motion control valve 21.

As compared to an arrangement having only the gas motion control valve 21, the addition of recirculation passage 16 further strengthen the tumbling flow in cylinder 2 by increasing the flow rate difference and flow velocity difference between the intake air stream through lower opening portion 20a on the lower side of intake valve 7, and the intake air stream through upper opening portion 20b on the upper side of intake valve 7. At the same opening degree of gas motion control valve 21, the arrangement of FIG. 2 can increase a tumble ratio. To achieve a predetermined tumble ratio, the recirculation passage 16 makes it possible to set the opening degree of gas motion control valve at a greater value. As a result, the arrangement of FIG. 2 can reduce the air flow resistance, and expands the operating region in which gas motion control valve 21 can be closed.

Figure 3:
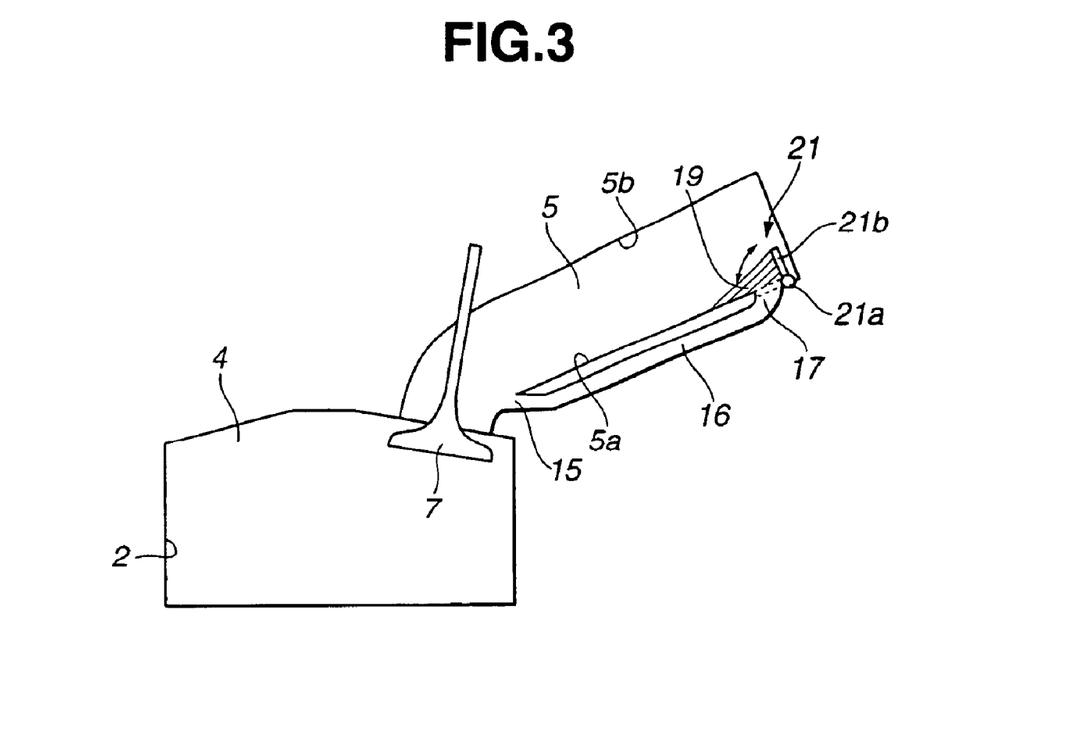
FIG. 3 is a sectional view showing an intake apparatus in a third practical example according to the first embodiment.

FIG. 3 shows an intake apparatus in a third practical example according to the first embodiment of the present invention. In the third example, a recirculation outlet 17 of a recirculation passage 16 is opened in lower inside wall surface 5a of intake port 5 at a position upstream of a recirculation inlet 15. In this example, recirculation outlet 17 is in the form of a slit elongated in the direction of the cylinder row, like recirculation inlet 15. A gas motion control valve 21 is provided at a position immediately upstream of recirculation outlet 17. A valve shaft of gas motion control valve 21 shown in FIG. 3 extends at the level of lower inside wall surface 5a of intake port 5, and supports one end of a swingable valve element 21b. In a closed position shown in FIG. 3, valve element 21b stands upright from lower inside wall surface 5a in intake port 5 and closes the lower region in intake port 5. Therefore, gas motion control valve 21 in the closed position produces a low pressure region 19 over the recirculation outlet 17 as shown in FIG. 3, and causes recirculation passage 16 to recirculate the intake air by sucking intake air from recirculation inlet 15. Thus, the intake apparatus of FIG. 3 can increase the incylinder tumbling fluid motion as in the preceding examples.

When gas motion control valve 21 is rotated to the downstream side, to an open position shown by a broken line in FIG. 3, valve element 21a extends along lower inside wall surface 5a so as not to impede the air flow in intake port 5, and closes the recirculation outlet 17. In the open state, the intake air does not flow into recirculation passage 16, and the intake air can flow smoothly in intake port 5.

Figure 4:
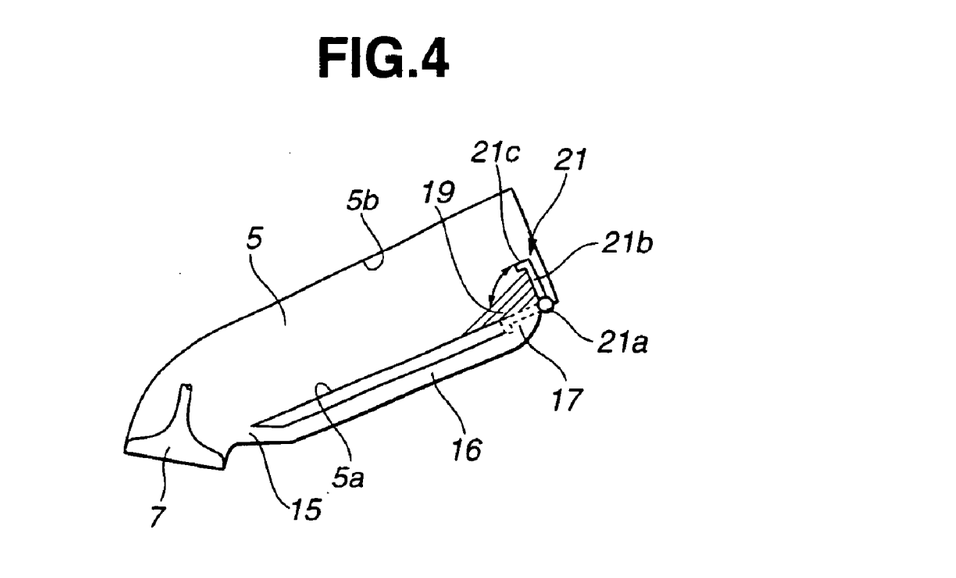
FIG. 4 is a sectional view showing a variation of the third practical example of FIG. 3.

FIG. 4 shows a variation of the third practical example of FIG. 3. As shown in FIG. 4, a valve element 21b of a gas motion control valve 21 has an end portion 21c bent at a swingable end. End portion 21c is angled at a right angle as a hook. In the closed position shown by a solid line in FIG. 4, valve element 21b projects upright from lower inside wall surface 5a of intake port 5, and bent portion 21c projects downstream. Therefore, in the closed position, bent portion 21c restrains the intake air from flowing around gas motion control valve 21 into the region behind the upright valve element 21b, and promotes the growth of low pressure region 19 to the downstream side. In the open position of gas motion control valve 21, the angled end portion 21c is received snugly in the opening of recirculation outlet 17 and gas motion control valve 21 does not impede the flow in intake port 5.

Figure 5:
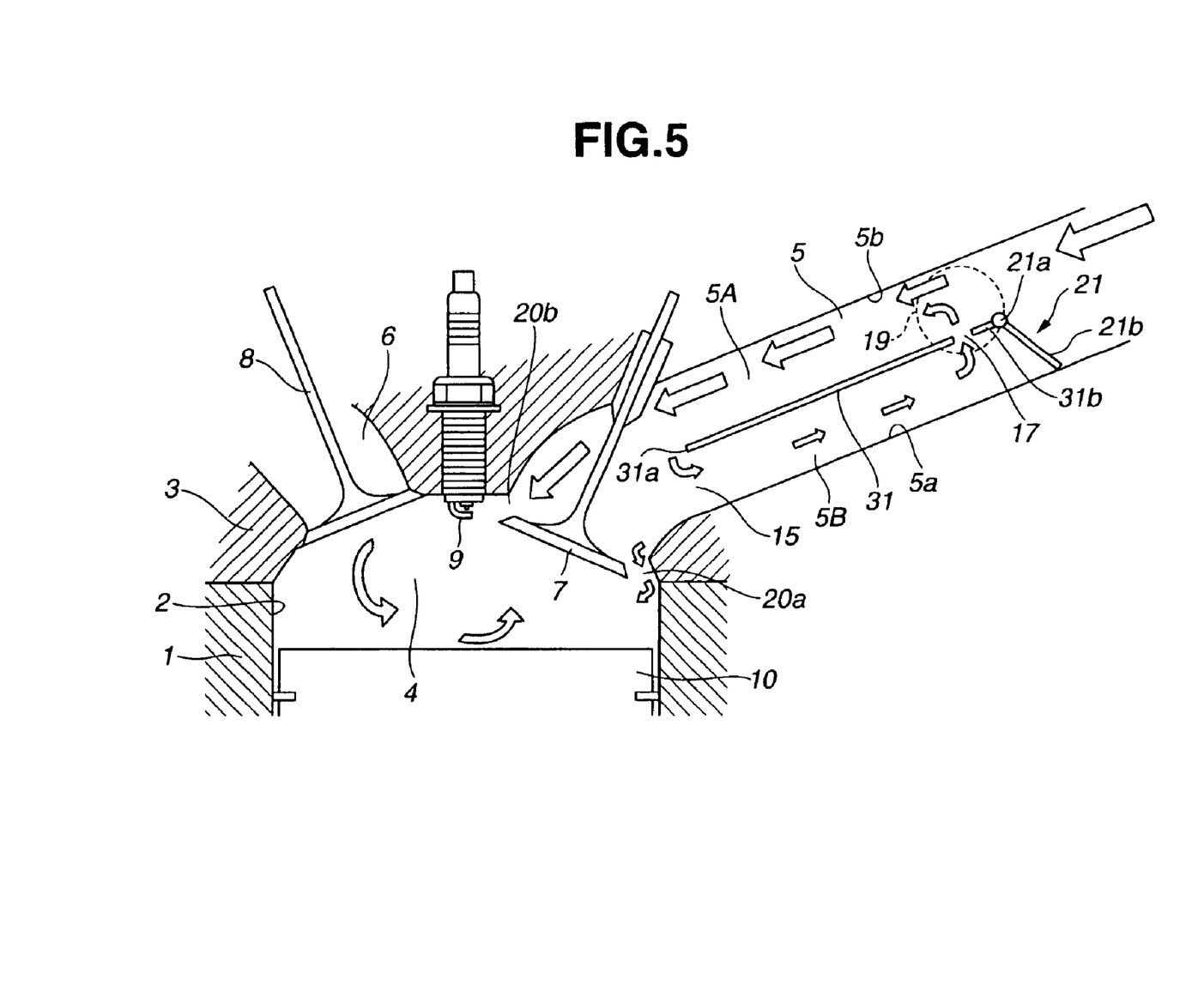
FIG. 5 is a sectional view showing an engine with an intake apparatus in a first practical example according to a second embodiment of the present invention.
Figure 6:
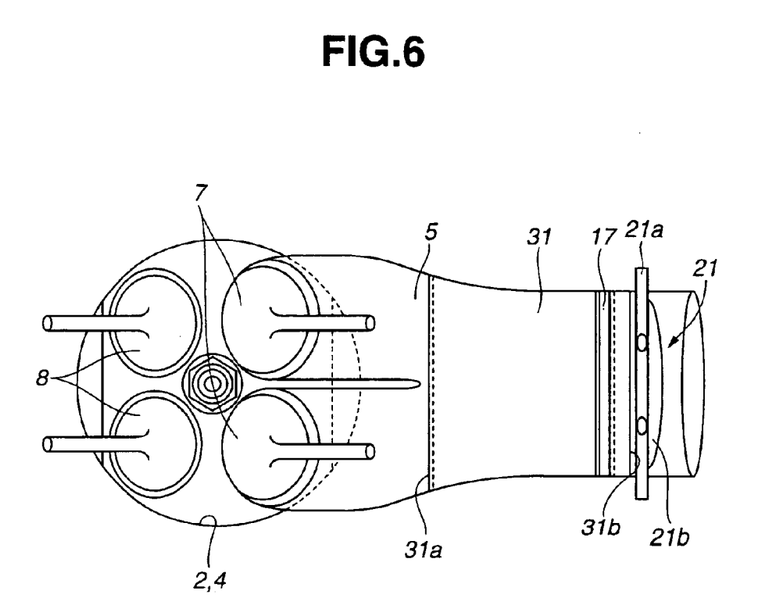
FIG. 6 is a plan view of the intake apparatus of FIG. 5 as viewed from above.

FIGS. 5 and 6 show a first practical example according to a second embodiment of the present invention. In the second embodiment, the recirculation passage is not external to the intake port, but the recirculation passage is defined in the intake port by a partition.

An intake apparatus shown in FIGS. 5 and 6 includes a partition 31 extending in the longitudinal direction of intake port 5 and dividing the cross section of intake port 5 into an upper region and a lower region. In this example, partition 31 is a metal plate formed as an insert in an operation of casting a cylinder head 3, and completed as an integral part of the casting. A downstream end 31a of partition 31 is located near intake valve 7. In the example shown in FIG. 5, the portion of intake port 5 receiving partition 31 extends straight in the longitudinal direction of intake port 5, and accordingly partition 31 is in the form of a flat plate extending straight in the longitudinal direction of intake port 5. However, intake port 5 may be curved, and partition 31 may be curved along the curved section of intake port 5.

Partition 31 divides intake port 5 into an upper fluid passage section 5A formed between partition 31 and upper inside wall surface 5b, and a lower fluid passage section 5B formed between partition 31 and lower inside wall surface 5a of intake port 5. In this example, lower fluid passage section 5B is used as a recirculation passage. A gas motion control valve 21 is arranged to open and close an upstream end of lower fluid passage section 5B. A valve shaft 21a of gas motion control valve 21 is located on an extension of partition 31 on the upstream side of partition 31. In the example of FIG. 5, valve shaft 21 is located at a position adjacent to an upstream end 31b of partition 3, on the upstream side of the upstream end 31b of partition 3. One end of a valve element 21b is supported by valve shaft 21a. Gas motion control valve 21, when in the open position, extends continuously from upstream end 31b of partition 31, in line with partition 31 along the flow direction, so that the passage resistance becomes minimum. In the closed position to close the upstream end of second passage section 5B as shown n FIG. 5, valve element 21b is so inclined as to guide the intake flow toward upper inside wall surface 5b into the first passage section 5A on the upper side.

When gas motion control valve 21 is in the closed position as shown in FIG. 5, gas motion control valve 21 serves as a flow throttling portion restricting the intake flow to upper passage section 5A, and thereby produces a low pressure region 19 immediately on the downstream side of the upstream partition end 31b. In this example, a recirculation outlet 17 is opened in an upstream end portion of partition 31 so as to discharge air into the low pressure region 19 formed over recirculation outlet 17. Recirculation outlet 17 is formed near upstream end 31b of partition 31. As shown in FIG. 6, recirculation outlet 17 is in the form of a slit extending in the direction of the cylinder row (in a direction perpendicular to the longitudinal direction of intake port 5).

When gas motion control valve 21 is in the closed position of FIG. 5, and the lower passage section 5B is closed by gas motion control valve 21, the intake air flows downstream only through upper passage section 5A. At the same time, the lower passage section 5B serves as the recirculation passage and recirculate part of the intake air to the upstream position through recirculation outlet 17. The downstream end of lower passage section 5B serves as recirculation inlet 15. By the pressure difference between the low pressure region 19 around recirculation outlet 17 and the downstream end of lower passage section 5B, the intake air is sucked into lower passage section 5B through the downstream end 15, recirculated through recirculation passage 5B in the reverse direction, and discharged through recirculation outlet 17 to the upstream portion of upper passage section 5A. Therefore, the intake air stream flowing into the cylinder 2 through lower opening portion 20a is weakened, and the intake air stream flowing into the cylinder 2 through upper opening portion 20b is increased to increase the incylinder tumbling fluid flow as shown by arrows in FIG. 5.

In the example of FIG. 5, intake port 5 is divided by partition 31, into upper and lower passage sections to increase tumble. However, partition 31 can be oriented in various ways to strengthen the incylinder swirling fluid flow or to strengthen an incylinder fluid motion intermediate between the tumble and swirl.

Figure 7:
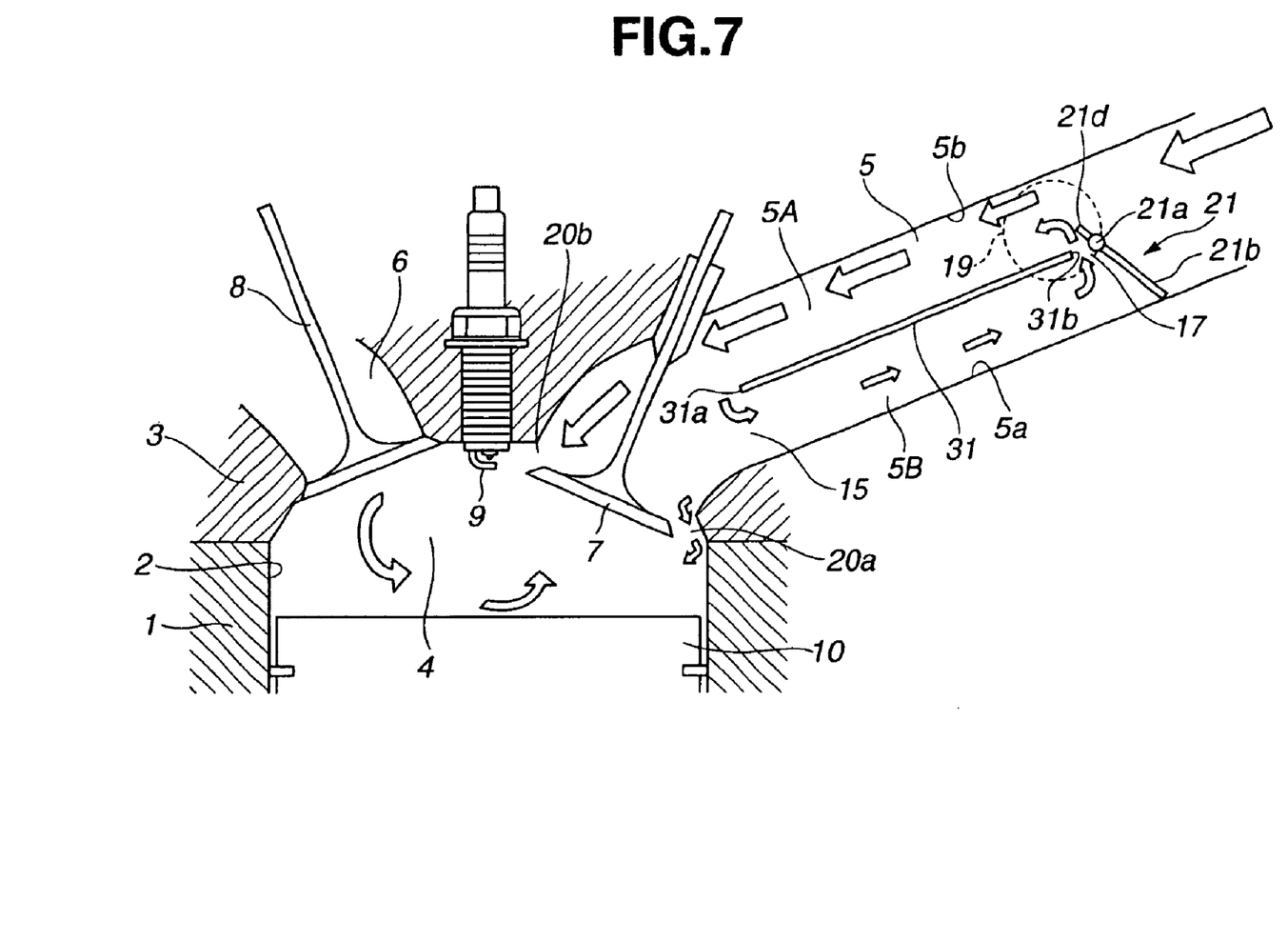
FIG. 7 is a sectional view showing an engine with an intake apparatus in a second practical example according to the second embodiment.
Figure 8:
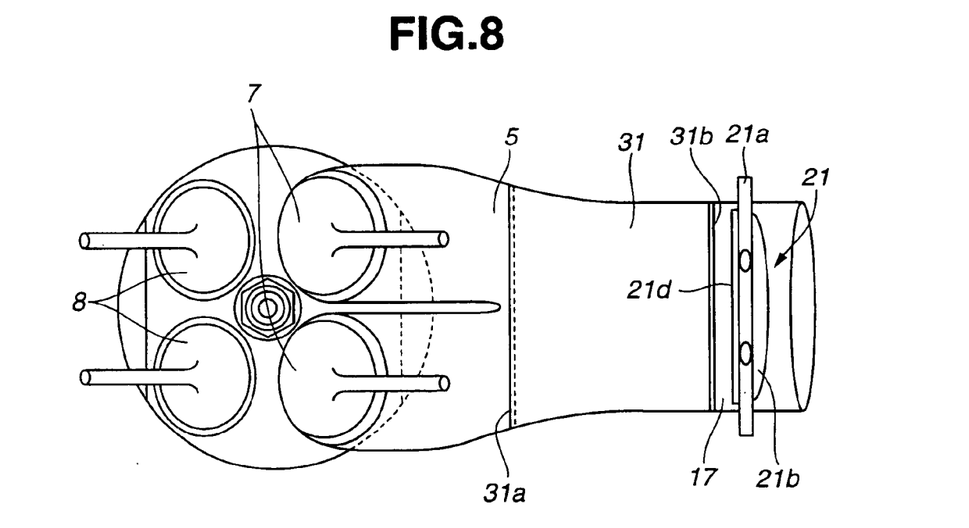
FIG. 8 is a plan view of the intake apparatus of FIG. 7 as viewed from above.

FIGS. 7 and 8 show a second practical example according to the second embodiment of the present invention. In this example, unlike the first example of FIGS. 5 and 6, a recirculation outlet 17 is defined as an interspace between the upstream end 31b of a partition 31 and a valve shaft 21a of a gas motion control valve 21. There is formed no slit in partition 31. A valve element 21b of gas motion control valve 21 includes a main portion for opening and closing the upstream end of lower passage section 5B. In addition to the main portion extending in one direction from valve shaft 21a, the valve element 21b further includes an extension portion 21d extending in the opposite direction from valve shaft 21a. The extension portion 21d is so shaped and sized to snugly close the recirculation outlet 17 defined between upstream end 31b of partition 31 and valve shaft 21a when gas motion control valve 21 is in the open position in which valve element 21b including extension portion 21d is in alignment with partition 31. The projecting length of extension portion 21d is approximately equal to the distance between upstream end 31b of partition 31 and valve shaft 21a. In this example, valve element 21b including the main portion and extension portion 21d is shaped like a flat plate. In the open position, valve element 21b extends continuously from upstream end 31b of flat partition 31 with almost no clearance, like a continuous flat partition wall.

In the closed position in which the main portion of valve element 21b closes the upstream end of lower passage section 5B, the interspace between the upstream end 31b of partition 31 and valve shaft 21a is opened, as recirculation outlet 17, to a low pressure region 19 formed by gas motion control valve 21 in the closed position. Therefore, like the first practical example according to the second embodiment shown in FIGS. 5 and 6, part of the intake air is recirculated through lower passage section 5B. Specifically in the second practical example shown in FIG. 7, the extension portion 21 projects upward in upper passage section 5A, and helps produce lower pressure region 19 effectively, so that the intake recirculation is ensured through recirculation outlet 17. When gas motion control valve 21 is put in the open position in the high speed high load engine operating region, extension portion 21d closes recirculation outlet 17, and thereby restrains disturbance in intake air streams.

Figure 9:
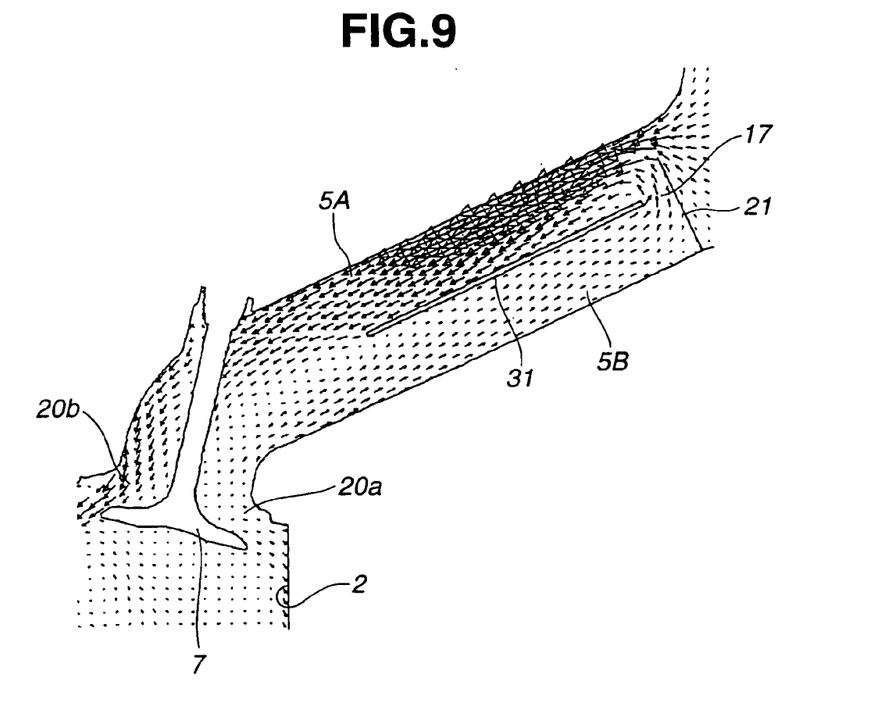
FIGS. 9 and 10 are schematic sectional views illustrating intake air streams in an intake port in the example of FIG. 7, and in an intake port in a comparative example.
Figure 10:
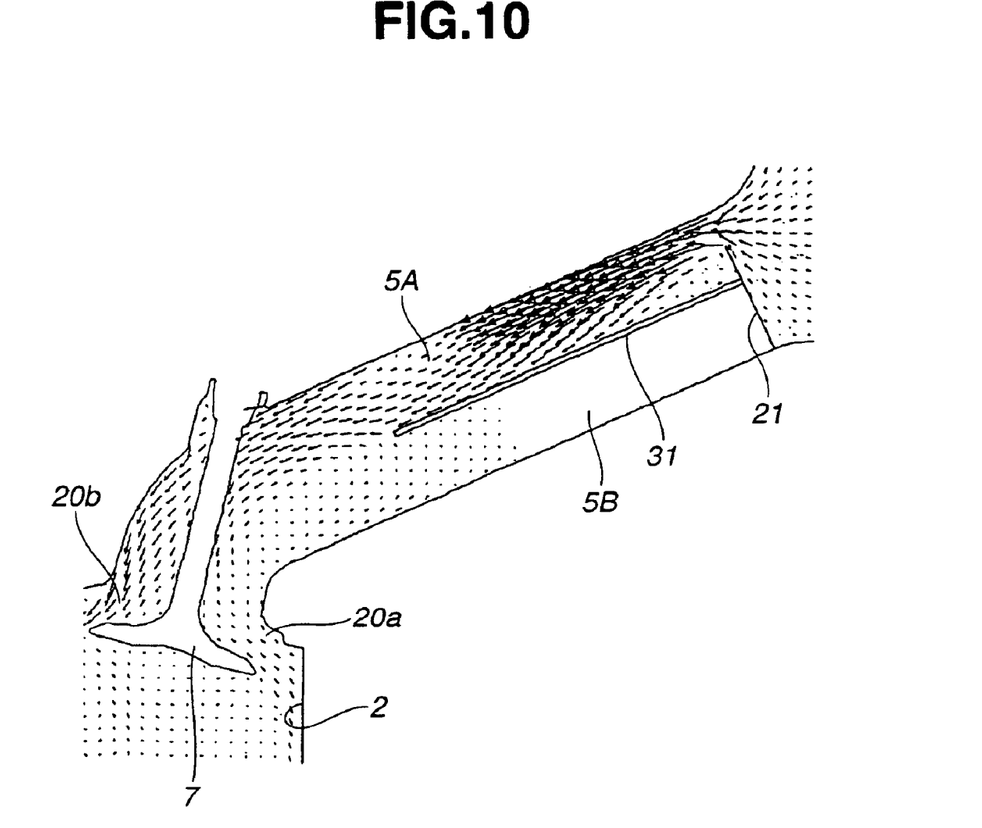

FIG. 9 shows the results of analysis of actual intake air flow in an intake apparatus according to the second practical example of the second embodiment. In FIG. 9, the speed and direction of fluid flow in each of points are shown as a vector by a small arrow. The density of arrows indicates the flow rate. The flow rate is high in a region in which arrows are dense, and low in a region in which arrows are coarse. FIG. 10 shows intake air flow in a comparative example in which the recirculation outlet 17 is eliminated. The arrangement of FIG. 10 corresponds to an intake system of earlier technology in which the intake air flow is deflected to one side merely by a partition wall 31 and a gas motion control valve 21. In both examples of FIGS. 9 and 10, the opening degree of gas motion control valve 21 is held at the same value (about 20%).

As evident from comparison between FIGS. 9 and 10, a considerable amount of intake air diffuses downward on the downstream side of the downstream end 31a of partition 31 in the example of FIG. 10, and flows through the lower open portion 20a on the lower side of intake valve 7 into the cylinder. In lower passage section 5B, the intake air is almost motionless and stagnant. In the case of FIG. 9, by contrast, intake air is recirculated from a lower region near intake valve 7. Therefore, the intake flow through lower open portion 20a is reduced significantly, and hence the flow through upper open portion 20b is increased correspondingly. Thus, the arrangement of FIG. 9 can increase the incylinder tumble effectively.

Figure 11A:
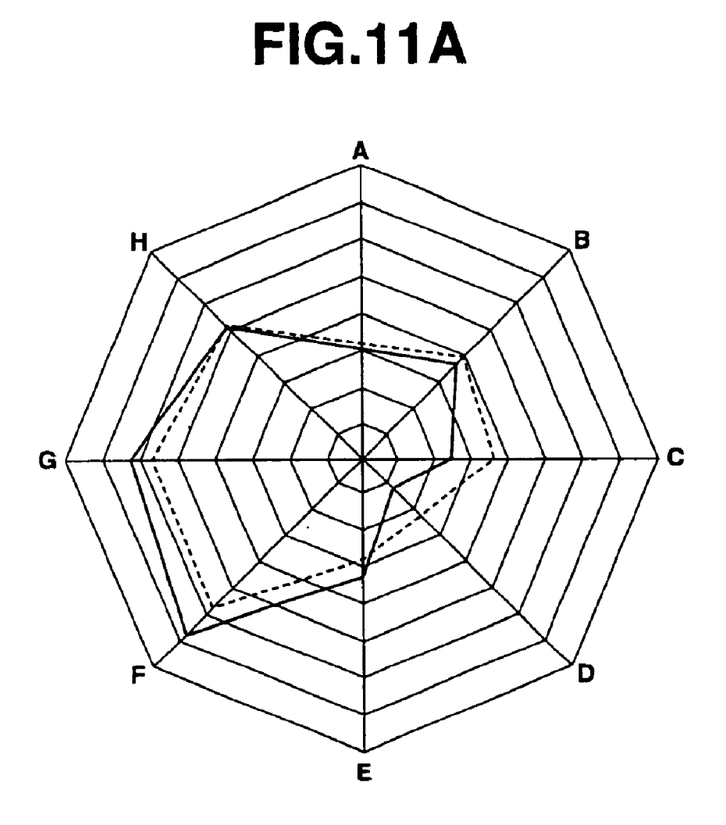
FIG. 11A is a diagram showing flow distribution around an intake port in the example of FIG. 7.
Figure 11B:
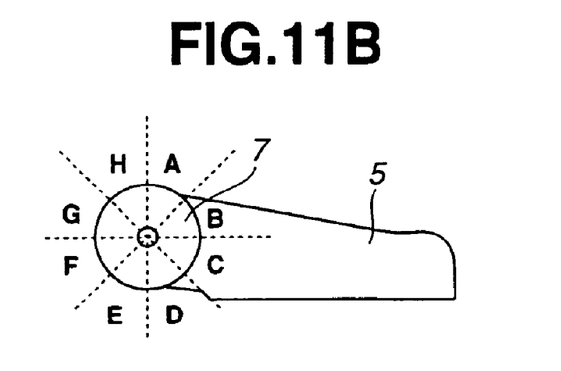
FIG. 11B is a plan view showing eight sectors used in FIG. 11A.

FIGS. 11A and 11B show the results of analysis of the intake air flow rate around intake valve 7. The circumference of 360° around intake valve 7 is divided into 8 sectors A~H of 45°, and the flow rate is plotted for each sector. Sectors B~C correspond to the lower open portion 20a, and sectors F~G correspond to the upper open portion 20b. In a characteristic of the example of FIG. 9 shown by solid lines in FIG. 11A, the flow rate is decreased in B~C sectors, and the flow rate is increased in sectors F~G, as compared to a characteristic of the comparative example of FIG. 10, shown by broken lines in FIG. 11A. In FIG. 11A, the flow rate becomes greater in a radial outward direction from the center.

Figure 12:
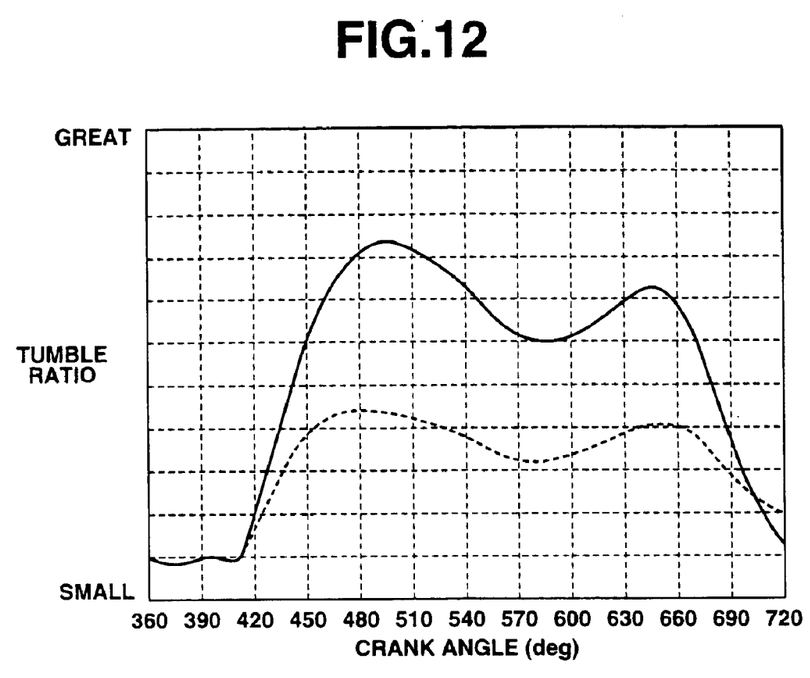
FIG. 12 is a graph showing a tumble ratio in the example of FIG. 7 in comparison with the comparative example.

FIG. 12 shows the results of analysis on a tumble ratio representing the intensity of tumble actually formed in cylinder 2. A broken line shows a characteristic in the comparative example of FIG. 10, and a solid line shows a characteristic of the practical example of FIG. 9 according to the second embodiment. As shown in FIG. 12, the intake system according to the second embodiment can increase the tumble ratio for the same open area ratio or opening degree.

Figure 13:
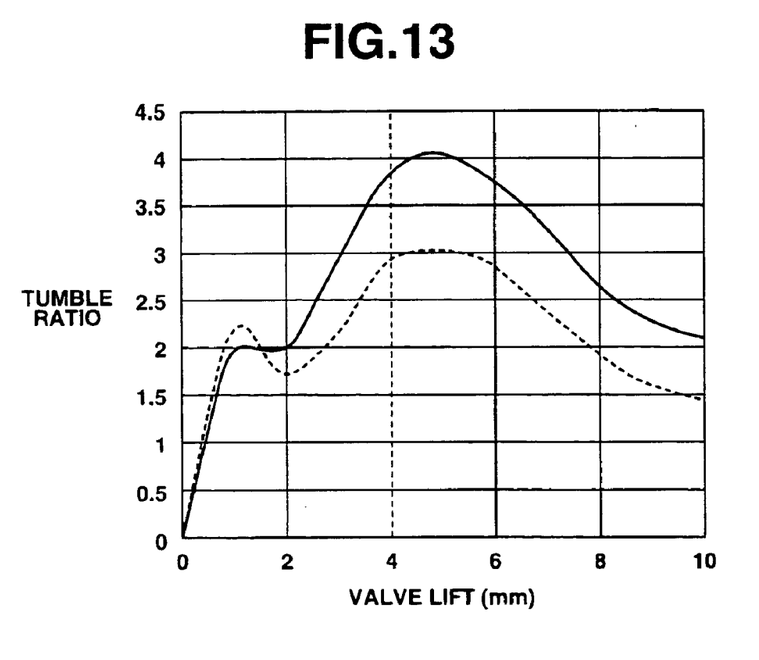
FIG. 13 is a graph showing a characteristic of the tumble ratio with respect to a valve lift, of the example of FIG. 7 in comparison with the comparative example.

FIG. 13 shows a tumble ratio of tumble formed in cylinder 2 with valve lift in the state in which the pressure difference between the inside of cylinder 2, and the upstream side of gas motion control valve 21 is held constant. A broken line shows a characteristic in the comparative example of FIG. 10, and a solid line shows a characteristic of the practical example of FIG. 9 according to the second embodiment. As evident from the comparison in FIG. 13, the intake system according to the second embodiment can further increase the tumble.

Figure 14:
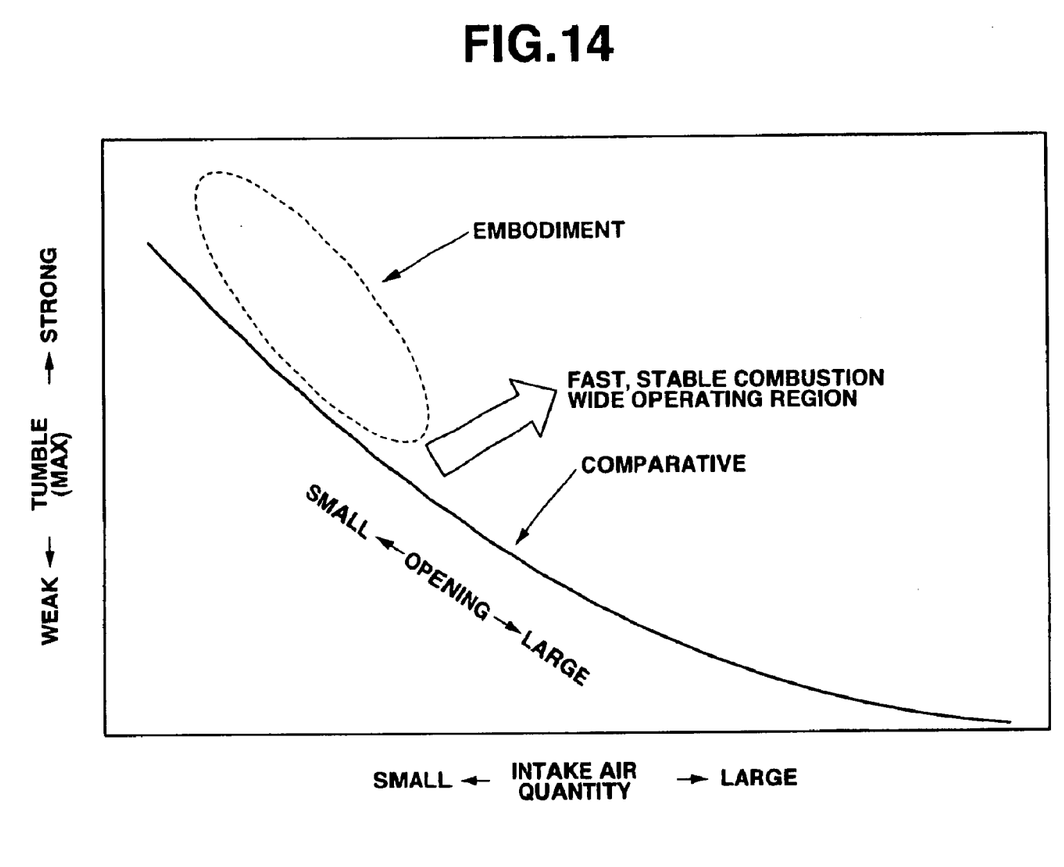
FIG. 14 is a graph showing a relation between the intensity of tumble and the intake air quantity, to illustrate effect of the example of FIG. 7.

FIG. 14 shows a relationship between the intensity of tumble and the intake air quantity in an intake system employing partition 31 and gas motion control valve 21 as in the examples of FIG. 9 and FIG. 10. In FIG. 14, the intensity of tumble is expressed as a maximum value of the tumble ratio during intake stroke. In general, the combustion tends to be slow and unstable when the tumble is weak, and the combustion tends to be fast and stable when the tumble is strong. A characteristic of the comparative example of FIG. 10 is shown by a solid line curve in FIG. 14. In the case of this characteristic, the tumble and the intake air quantity are related to each other in the following manner. As the open area ratio or opening degree is set to a smaller value, the tumble is increased but the intake air quantity becomes smaller. As the open area ratio or opening degree is increased, on the other hand, the intake air quantity is increased, but the tumble is decreased. A decrease of the intake air quantity means a reduction in the area of a tumble operating region in which tumble can be produced, that is an operating region in which gas motion control valve 21 can be closed. Inversely, an increase of intake air quantity means an increase in the area of increased when the intake air quantity (or the opening degree) is held constant.

In the illustrated examples, at least cylinder head 3 corresponds to a main section defining an intake port having therein first and second regions extending longitudinally of the intake port. External member defining an external recirculation passage or partition 31 corresponds to a recirculating section defining an intake recirculation passage. Throttle valve 11 or intake control valve 21 corresponds to a flow throttling section to produce a low pressure region in the upstream portion of the intake port. Cylinder block 1 and cylinder head 3 correspond to an engine block member. The engine block member may further comprises an external member such as an intake manifold. An intake apparatus according to the illustrated embodiments comprises first means for defining an intake port having therein first and second regions extending longitudinally of the intake port; and second means for defining an intake recirculation passage to recirculate part of intake air from the second region in a downstream end portion of the intake port, to the first region in an upstream portion of the intake port and thereby for strengthening an intake air stream in the first region of the intake port. Cylinder head 3 corresponds to the first means, and at least one of items 16, 31, 21 and 11 corresponds to the second means.

This application is based on a prior Japanese Patent Application No. 2002-290749 filed on Oct. 3, 2002. The entire contents of this Japanese Patent Applications No. 002-290749 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An intake apparatus for an internal combustion engine, comprising:
   a main section defining an intake port having therein first and second regions extending longitudinally of the intake port;
   a recirculating section defining an intake recirculation passage to recirculate part of intake air from the second region in the intake port to an upstream position in the intake port to strengthen an intake air stream in the first region of the intake port; and
   a flow throttling section including a flow throttling valve to produce a low pressure region in the intake port when the flow throttle valve is in a closed position, the intake recirculation passage being opened to the low pressure region produced by the flow throttling valve.

2. The intake apparatus as claimed in claim 1, wherein the recirculation passage extends from a recirculation inlet opened in a downstream end portion of the intake port, to a recirculation outlet opened in an upstream portion of the intake port, to take in part of the intake air before flowing into a cylinder of the engine through an intake valve provided at a downstream end of the intake port, and to return the intake air to the upstream portion of the intake port.

3. The intake apparatus as claimed in claim 2, wherein the flow throttling valve is a throttle valve.

4. The intake apparatus as claimed in claim 2, wherein the flow throttling valve is a gas motion control valve to close a part of the intake port.

5. The intake apparatus as claimed in claim 1, wherein the recirculation inlet is opened in an inside wall surface of the intake port, and the recirculation passage extends outside the intake port.

6. The intake apparatus as claimed in claim 1, wherein the recirculation outlet opens into the first region of the intake port.

7. The intake apparatus as claimed in claim 6, wherein the recirculating section includes a pipe section projecting into the intake port toward an inside wall surface defining the first region of the intake port.

8. The intake apparatus as claimed in claim 2, wherein the recirculating section comprises a partition dividing the intake port into a first passage section defining the first region of the intake port, and a second passage section serving as the recirculation passage.

9. An intake apparatus for an internal combustion engine, comprising:
   a main section defining an intake port having therein first and second regions extending longitudinally of the intake port;
   a recirculating section defining an intake recirculation passage to recirculate part of intake air from the second region in the intake port to an upstream position in the intake port to strengthen an intake air stream in the first region of the intake port; and
   a flow throttling section to produce a low pressure region in the upstream portion of the intake port,
   wherein the recirculation passage extends from a recirculation inlet opened in a downstream end portion of the intake port, to a recirculation outlet opened in an upstream portion of the intake port, to take in part of the intake air before flowing into a cylinder of the engine through an intake valve provided at a downstream end of the intake port, and to return the intake air to the upstream portion of the intake port, wherein the recirculation outlet of the recirculation passage is opened to the low pressure region produced by the flow throttling section, and wherein the first region of the intake port is an upper region located above the second region of the intake port, and the second region of the intake port is a lower region located below the upper region in an up-down direction of a cylinder of the engine.

10. An intake apparatus for an internal combustion engine, comprising:

a main section defining an intake port having therein first and second regions extending longitudinally of the intake port;

a recirculating section defining an intake recirculation passage to recirculate part of intake air from the second region in the intake port to an upstream position in the intake port to strengthen an intake air stream in the first region of the intake port; and a flow throttling section to produce a low pressure region in the upstream portion of the intake port, wherein the recirculation passage extends from a recirculation inlet opened in a downstream end portion of the intake port, to a recirculation outlet opened in an upstream portion of the intake port, to take in part of the intake air before flowing into a cylinder of the engine through an intake valve provided at a downstream end of the intake port, and to return the intake air to the upstream portion of the intake port, wherein the recirculation outlet of the recirculation passage is opened to the low pressure region produced by the flow throttling section, and wherein the main section includes an upper inside wall surface which defines the first region in the intake port and which includes a curved downstream end portion curved concavely to guide the intake air stream along the upper inside wall surface into a combustion chamber of a cylinder of the engine, and a lower inside wall surface confronting the upper inside wall surface and defining the second region in the intake port.

11. An intake apparatus for an internal combustion engine, comprising:

a main section defining an intake port having therein first and second regions extending longitudinally of the intake port;

a recirculating section defining an intake recirculation passage to recirculate part of intake air from the second region in the intake port to an upstream position in the intake port to strengthen an intake air stream in the first region of the intake port; and a flow throttling section to produce a low pressure region in the upstream portion of the intake port, wherein the recirculation passage extends from a recirculation inlet opened in a downstream end portion of the intake port, to a recirculation outlet opened in an upstream portion of the intake port, to take in part of the intake air before flowing into a cylinder of the engine through an intake valve provided at a downstream end of the intake port, and to return the intake air to the upstream portion of the intake port, wherein the recirculation outlet of the recirculation passage is opened to the low pressure region produced by the flow throttling section, wherein the recirculating section comprises a partition dividing the intake port into a first passage section defining the first region of the intake port, and a second passage section serving as the recirculation passage, and wherein the flow throttling section includes a gas motion control valve to open and close an upstream end of the second passage section of the intake port; and the recirculation outlet is an aperture formed near the gas motion control valve, for allowing a recirculation air to flow from the second passage section to the first passage section.

12. An internal combustion engine comprising:

an engine block member defining an engine cylinder and an intake port extending to the cylinder;

an intake valve to open and close a downstream end of the intake port;

a recirculating section defining an intake recirculation passage to recirculate part of intake air to strengthen an intake air stream flowing into the cylinder through a first part of a downstream end portion of the intake port and weaken an intake air stream flowing into the cylinder through a second part of the downstream end portion of the intake port when the intake valve is opened, the recirculation passage extending from a recirculation inlet opened in the downstream end portion of the intake port to take in part of intake air from the second part of the downstream end portion of the intake port, to a recirculation outlet to discharge the intake air into an upstream portion of the intake port upstream of the downstream end portion to strengthen the intake air stream through the first part of the downstream end portion of the intake port; and a flow throttling valve to produce a low pressure region in the upstream portion of the intake port, the recirculation outlet of the recirculation passage being opened to the low pressure region produced by the flow throttling valve.

13. An intake apparatus for an internal combustion engine, comprising:

first means for defining an intake port having therein first and second regions extending longitudinally of the intake port; and second means for defining an intake recirculation passage to recirculate part of intake air from the second region in a downstream end portion of the intake port, to the first region in an upstream portion of the intake port and thereby for promoting in-cylinder fluid motion in the engine by strengthening an intake air stream in the first region of the intake port in a first state, whereas the second means further has a second state not to strengthen the intake air stream in the first region of the intake port.

* * * * *